United States Patent
Park

(10) Patent No.: US 8,732,529 B2
(45) Date of Patent: May 20, 2014

(54) MOBILE COMMUNICATION TERMINAL CAPABLE OF TESTING APPLICATION AND METHOD THEREOF

(75) Inventor: Sung Bin Park, Gyeonggi-do (KR)

(73) Assignee: Helix Technology Inc., Seoul (KR)

( * ) Notice: Subject to any disclaimer, the term of this patent is extended or adjusted under 35 U.S.C. 154(b) by 349 days.

(21) Appl. No.: 13/243,239

(22) Filed: Sep. 23, 2011

(65) Prior Publication Data

US 2012/0151269 A1    Jun. 14, 2012

(30) Foreign Application Priority Data

Dec. 10, 2010    (KR) .................. 10-2010-0126419

(51) Int. Cl.
G06F 11/36    (2006.01)

(52) U.S. Cl.
USPC ........................................... 714/38.1; 714/31

(58) Field of Classification Search
USPC .................................... 714/38.1, 31
See application file for complete search history.

(56) References Cited

U.S. PATENT DOCUMENTS

| | | | |
|---|---|---|---|
| 6,002,872 A | 12/1999 | Alexander, III et al. | |
| 6,434,364 B1 * | 8/2002 | O'Riordain | 455/67.11 |
| 7,165,191 B1 * | 1/2007 | Vakrat | 714/38.1 |
| 7,603,715 B2 | 10/2009 | Costa et al. | |
| 2004/0153774 A1 * | 8/2004 | Gavish et al. | 714/25 |
| 2005/0005198 A1 * | 1/2005 | Vakrat et al. | 714/37 |
| 2005/0188262 A1 * | 8/2005 | Rosenman et al. | 714/25 |
| 2006/0039538 A1 * | 2/2006 | Minnis et al. | 379/1.01 |
| 2006/0174162 A1 * | 8/2006 | Varadarajan et al. | 714/38 |
| 2008/0072050 A1 * | 3/2008 | Klonover et al. | 713/176 |
| 2008/0214186 A1 * | 9/2008 | Bizzarri et al. | 455/425 |
| 2009/0307763 A1 * | 12/2009 | Rawlins et al. | 726/5 |
| 2010/0095159 A1 * | 4/2010 | Jeong et al. | 714/38 |
| 2010/0136961 A1 * | 6/2010 | Kahler et al. | 455/418 |
| 2011/0202889 A1 * | 8/2011 | Ludwig et al. | 715/856 |
| 2012/0084793 A1 * | 4/2012 | Reeves et al. | 719/313 |

FOREIGN PATENT DOCUMENTS

| | | | |
|---|---|---|---|
| KR | 10-2002-0029918 A | 4/2002 | |
| KR | 10-2009-0047152 A | 5/2009 | |
| KR | 2009122665 A | * 12/2009 | |

OTHER PUBLICATIONS

Bordeaux, Paul, "The Android Monkey", Oct. 3, 2008, http://www.sundoginteractive.com/sunblog/posts/the-android-monkey.*
Fitzroy-Dale, Nicholas, "Testing with Monkey", Dec. 13, 2011, http://blog.apkudo.com/2011/12/13/testing-with-monkey/.*

* cited by examiner

*Primary Examiner* — Chae Ko
(74) *Attorney, Agent, or Firm* — Sughrue Mion, PLLC

(57) ABSTRACT

Disclosed is a method for testing an application in a testing agent which resides on an application layer of a mobile communication terminal mounted with a platform designed so that applications of the application layer operate independently from each other and a command is not directly transferred between the applications. The method includes: receiving a command for testing a test target application from a testing apparatus; generating an event corresponding to the transferred command; and registering the generated event in a window manager positioned on a framework layer in order to transfer the generated event to the test target application.

12 Claims, 5 Drawing Sheets

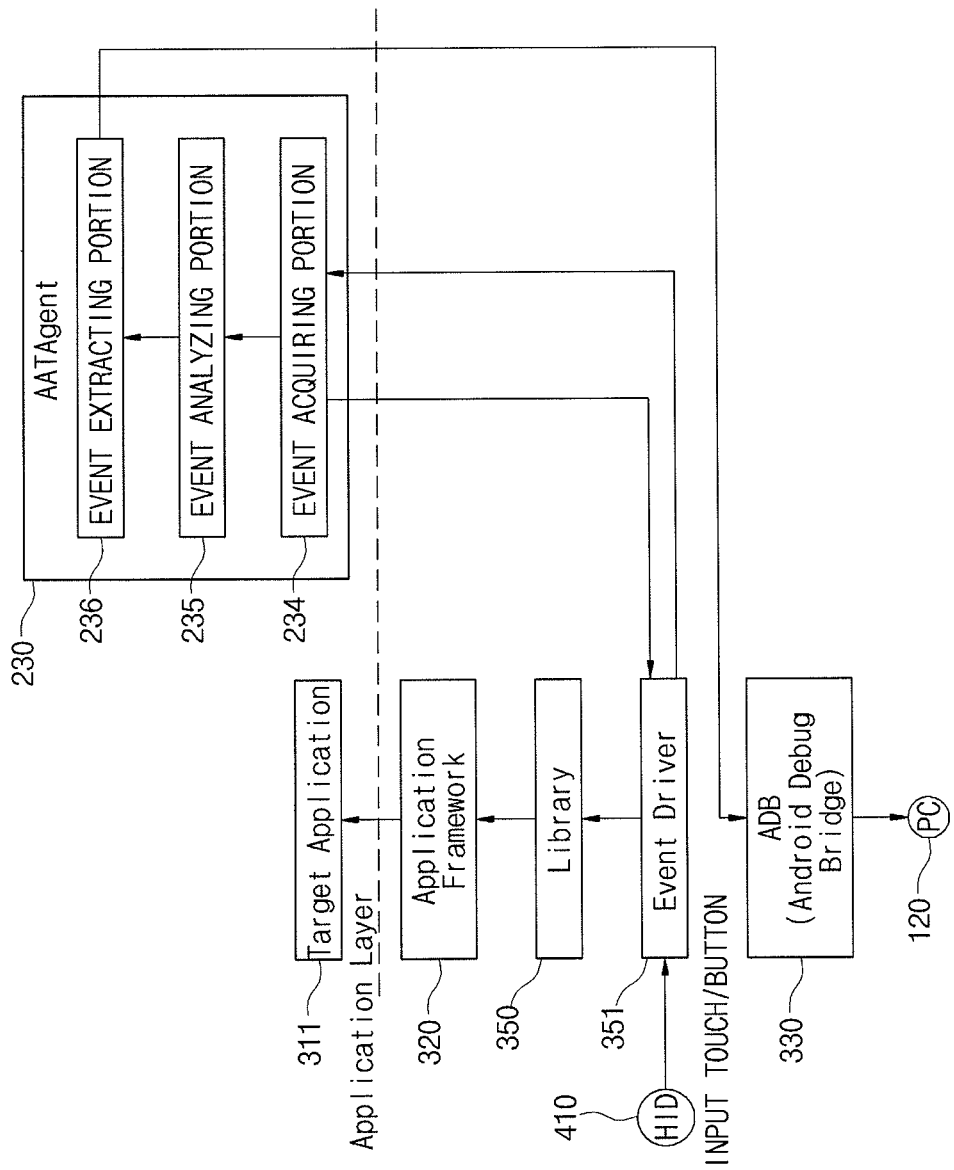

MOBILE COMMUNICATION TERMINAL CAPABLE OF TESTING APPLICATION AND METHOD THEREOF

CROSS-REFERENCE TO RELATED APPLICATIONS

This application claims priority under 35 U.S.C. §119 to Korean Patent Application No. 10-2010-0126419, filed on Dec. 10, 2010, in the Korean Intellectual Property Office, the disclosure of which is incorporated herein by reference in its entirety.

TECHNICAL FIELD

The present invention relates to a technology for verifying or controlling a state of a device (e.g., a smart phone) in a host (e.g., a PC).

BACKGROUND

An android platform as a software stack opened in the Open Handset Alliance (OHA) led by Google means a software package encompassing all of a Linux kernel, a virtual machine (VM), a framework, and an application. The android platform can be primarily applied to only a high-specification smart terminal that provides a display with a large screen of a wide VGA (WVGA) which is a resolution of 800×400 and an input in a touch screen. The entire android software stack should be applied to the smart terminal in order to execute an android application. Since the android software stack includes the Linux kernel and includes a plurality of basic services such as a system Demon, the android software stack is a platform suitable for a high-specification and high-end smart phone.

Meanwhile, in the current android smart phone, there is generally no method in which one application that resides on an application layer can control other applications having a phase equivalent to the one application or verify operational states of the applications. The reason therefor is that the android platform is designed so that the respective applications that exist on the application layer operate independently from different applications. Accordingly, as long as an application developer does not perform a design to make an additional interface in order to exchange information between applications particularly developed by the application developer, one application cannot monitor or control operations of other applications.

The structure of the android platform becomes a decisive fault factor in testing whether various and numerous android applications operate normally and developing an evaluation and testing program. Moreover, as application software installed in the android smart phones has been arbitrarily developed by different developers and the number thereof increases exponentially, problem consciousness and a management method for securing the reliability of the quality of the application software have been strongly required in recent years.

SUMMARY

An exemplary embodiment of the present invention provides a method for testing an application in a testing agent which resides on an application layer of a mobile communication terminal mounted with a platform designed so that applications of the application layer operate independently from each other and a command is not directly transferred between the applications, the method including: receiving a command for testing a test target application from a testing apparatus; generating an event corresponding to the transferred command; and registering the generated event in a window manager positioned on a framework layer in order to transfer the generated event to the test target application. Herein, in the receiving of the command, the command may be received through an android debug bridge (ADB).

The method may further include: acquiring events by directly accessing an event driver positioned on a library layer; analyzing and classifying the acquired events; extracting only an event corresponding to the test target application among the classified events; and transferring the extracted event to the testing apparatus. Herein, in the transferring, the extracted event may be transferred to the testing apparatus through the android debug bridge (ADB).

Another exemplary embodiment of the present invention provides a method for testing an application in a testing agent which resides on an application layer of a mobile communication terminal mounted with a platform designed so that applications of the application layer operate independently from each other and a command is not directly transferred between the applications, the method including: acquiring events by directly accessing an event driver positioned on a library layer; analyzing and classifying the acquired events; extracting only an event corresponding to the test target application among the classified events; and transferring the extracted event to a testing apparatus.

Yet another exemplary embodiment of the present invention provides a mobile communication terminal capable of testing an application, which is mounted with a platform designed so that applications of an application layer operate independently from each other and a command is not directly transferred between the applications, the mobile communication terminal including: a communication unit for communicating with a testing apparatus for testing an application operation; and a control unit including a command analyzing portion analyzing a command for testing a test target application, which is transferred from the testing apparatus through the communication unit, an event generating portion generating an event corresponding to the analyzed command, and an event registering portion registering the generated event in a window manager of an application framework layer in order to transfer the generated event to the test target application.

The control unit may further include: an event acquiring portion acquiring events by directly accessing an event driver positioned on a library layer; an event analyzing portion analyzing the acquired events; and an event extracting portion extracting only an event corresponding to the test target application according to the analysis result and transferring the extracted event to the testing apparatus.

Other features and aspects will be apparent from the following detailed description, the drawings, and the claims.

BRIEF DESCRIPTION OF THE DRAWINGS

FIG. 6 is a flowchart showing the transferring of the event in FIG. 5.

DETAILED DESCRIPTION OF EMBODIMENTS

Figure 1:
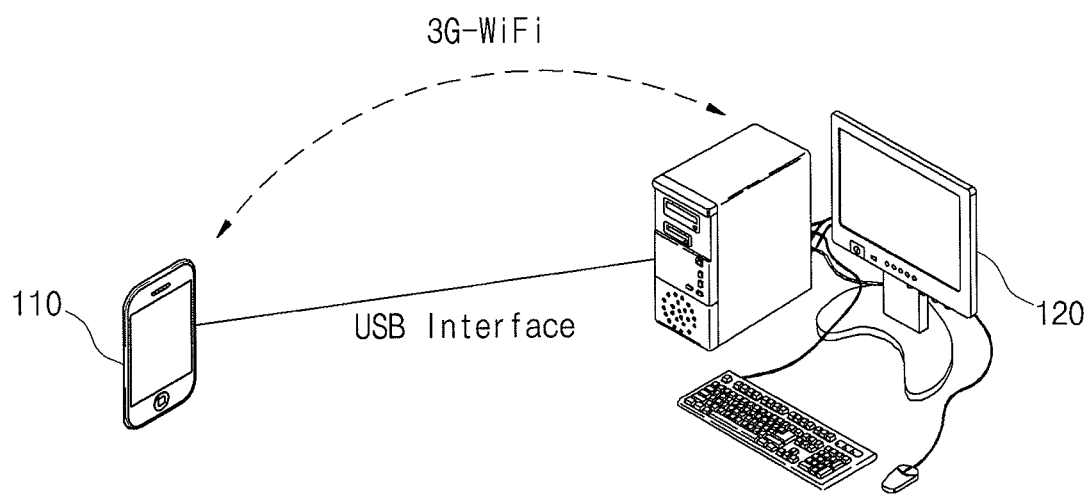
FIG. 1 is a diagram showing a connection structure between a smart phone and a testing device for testing an application of the smart phone according to an exemplary embodiment of the present invention.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram of a connection structure between a mobile communication terminal and a PC for testing an application of the mobile communication terminal according to an exemplary embodiment of the present invention.

The mobile communication terminal 110 may be a smart phone. However, the mobile communication terminal 110 is not limited thereto. The PC 120 is a testing apparatus for testing an application of the smart phone 110 and an apparatus other than the PC may be used. The smart phone 110 is connected with the PC 120 in a wired method. For example, as a wired connection path, a serial cable or a USB cable may be used. However, the wired connection method has an environmental limit in which the smart phone 110 and the PC 120 should be physically connected to each other in the same space. Therefore, the smart phone 110 and the PC 120 may be connected to each other through a wireless connection method. For example, as the wireless connection method, 3G or WiFi may be adopted. In a communication method between the smart phone 110 and the PC 120, serial or USB may be physically used and an android debug bridge (ADB), a transmission control protocol (TCP), and the like may be logically used.

Figure 2:
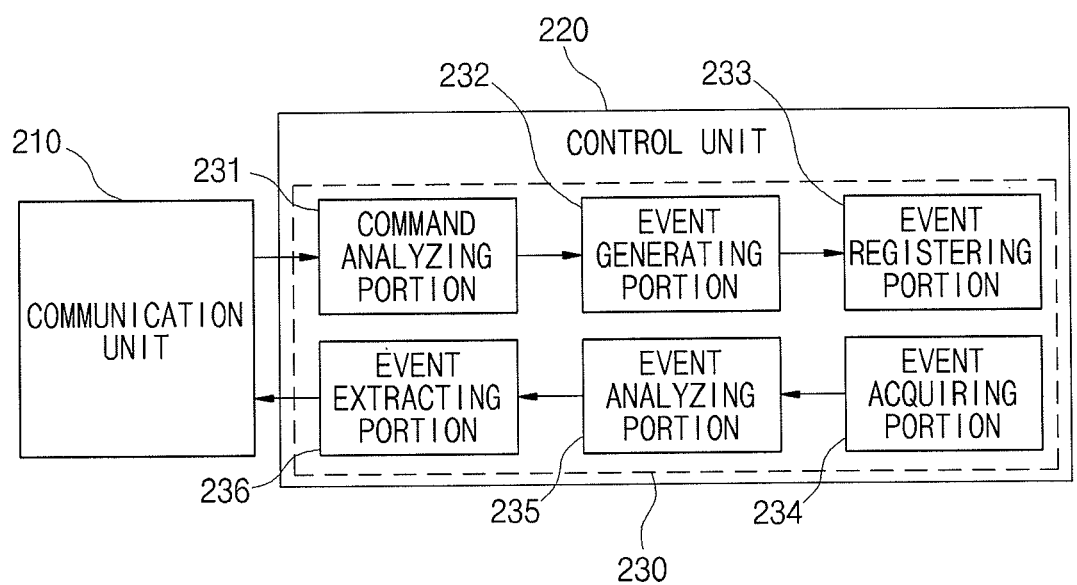
FIG. 2 is a block diagram of a smart phone for testing a test target application according to an exemplary embodiment of the present invention.

FIG. 2 is a block diagram of a smart phone for testing an application according to an exemplary embodiment of the present invention.

The smart phone 110 includes a communication unit 210 and a control unit 220. The communication unit 210 supports at least one of a wired communication interface and a wireless communication interface. As an example of the wired communication interface, a serial interface or a USB interface may be used and as an example of the wireless communication interface, an interface according to a 3G or WiFi communication standard may be used. The smart phone 110 is communication-connected with the PC 120 for testing the application of the smart phone 110 through the communication unit 210. The control unit 220 as a controller for controlling the smart phone 110 loads and executes a testing agent (AATAgent) 230 which is a program for testing the application to activate an application testing function. The control unit 220 includes a command analyzing portion 231, an event generating portion 232, and an event registering portion 233 for testing the application while executing the testing agent 230. The command analyzing portion 231 analyzes a command for the test target application, which is transferred through the communication unit 210. When which event the command is for the test target application is verified by the command analyzing portion 231, the event generating portion 232 generates the corresponding event. When the event is generated by the event generating portion 232, the event registering portion 233 registers the event in a window manager of an application framework layer. The event registered in the window manager is transferred to the test target application, and as a result, the test target application recognizes the transferred event as an event that should be normally accepted to output a series of results (reactions) therefor.

Meanwhile, the control unit 220 further includes an event acquiring portion 234, an event analyzing portion 235, and an event extracting portion 236. The event acquiring portion 234 directly accesses an event driver of the Linux kernel to acquire events. Herein, the events include all of key data and touch data which a user inputs through a human interface device (HID), and an event internally generated in the smart phone. The event analyzing portion 235 analyzes the events acquired by the event acquiring portion 234. In the exemplary embodiment, the event analyzing portion 235 analyzes types of the events to classify whether the corresponding events are the key event or the touch event or the internally generated event. Herein, since the key event and the touch event mean a user's manipulating the test target application, which is being executed, the key event and the touch event become events corresponding to the test target application. The event extracting portion 236 extracts the events corresponding to the test target application among the events analyzed by the event analyzing portion 235 or only a content of the event and transfers the extracted event or only a content included in codes constituting the event to the PC 120 through the communication unit 210. Herein, the event content means detailed key data/touch data inputted by a user to give a predetermined command with respect to the test target application.

Figure 3:
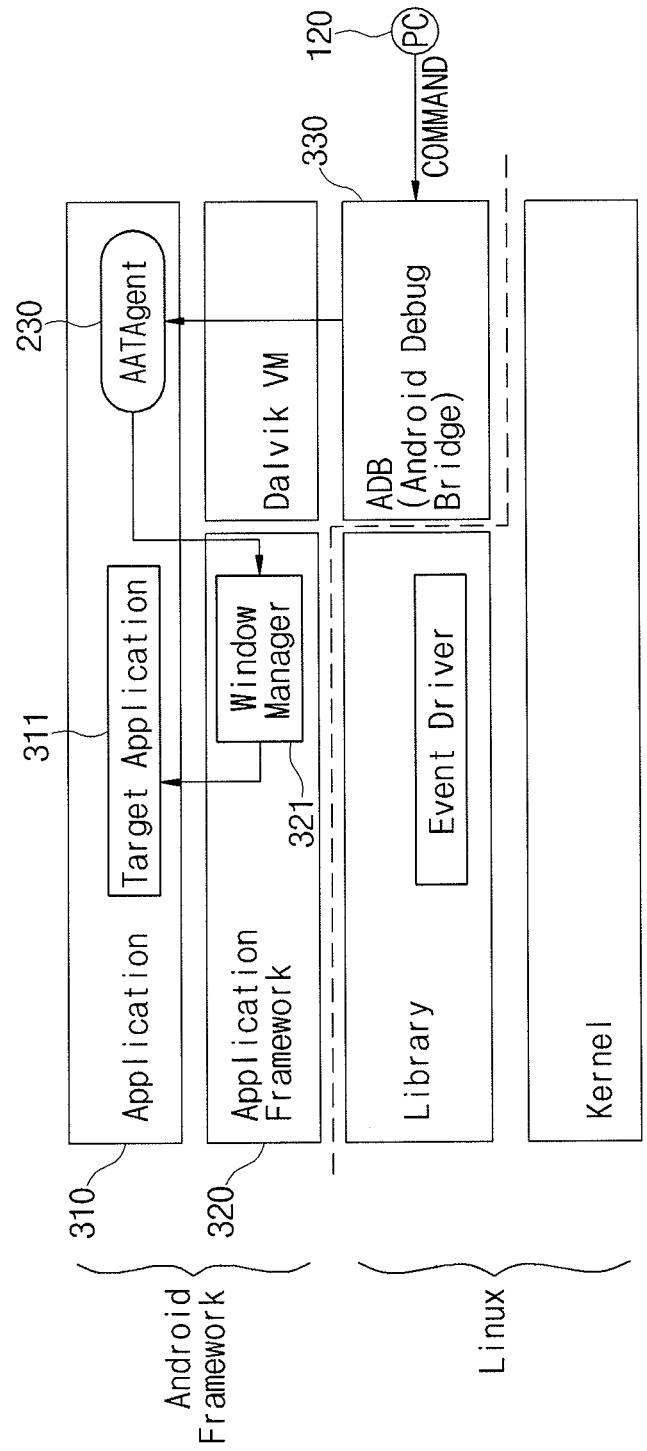
FIG. 3 is a reference diagram for describing control of the test target application according to the exemplary embodiment of the present invention.

FIG. 3 is a reference diagram for describing a method for controlling the test target application according to the exemplary embodiment of the present invention.

The platform shown in FIG. 3 is the android platform. The applications positioned on an application layer 310 of the android platform are driven independently from each other and cannot give and receive any command directly to and from each other. Therefore, it is difficult to test an operational state of the application. In order to overcome the technical limitation, the testing agent (AATAgent) 230 that can transfer the command to the test target application (user application) 311 to be tested is implemented on the application layer 310 by using the window manager 321 positioned on the application framework layer 320. When a PC user gives the command through the PC 120 in order to test the operational state of the test target application 311, this command is transferred to the testing agent 230 through the android debug bridge (ADB) 330. The testing agent 230 analyzes the command from the PC 120 to verify an event corresponding to the analyzed command, and generates an event in the same manner as the case where the window manager 321 gives an event to the test target application 311 and thereafter, registers the generated event in the window manager 321. When the corresponding event is registered in the window manager 321 to be transferred to the test target application 311, the test target application 311 recognizes the corresponding event as the event that should be accepted abnormally to output a series of results (reactions) corresponding to the event.

Figure 4:
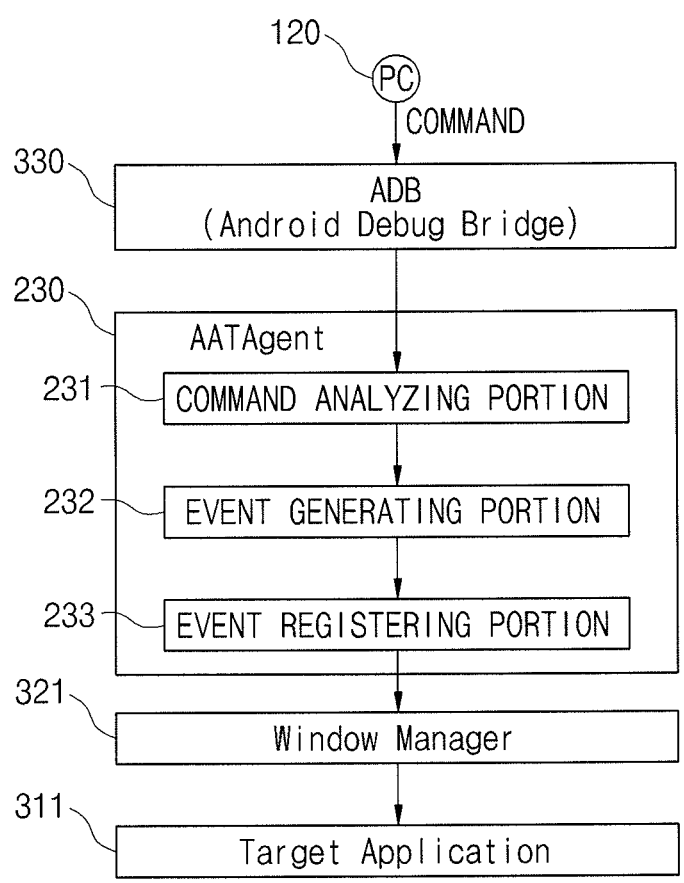
FIG. 4 is a flowchart showing the control of the test target application in FIG. 3.

FIG. 4 is a flowchart expressing the control of the test target application in FIG. 3.

When a command is transferred from the PC 120, the command is transferred to the testing agent 230 through the ADB 330. The command analyzing portion 231 of the testing agent 230 analyzes the command transferred through the ADB 330. The event generating portion 232 generates an event for the operation of the test target application 311 according to the command analyzed by the command analyzing portion 231. Herein, the event generating portion 232 should generate the event of the same type as the event which the window manager 321 receives from the event driver 341 and gives to the test target application 311. When the event is generated by the event generating portion 232, the event registering portion 233 registers the generated event in the window manager 321. Therefore, the window manager 321 transfers the registered event to the test target application 311 and the test target application 311 outputs a result corresponding to the transferred event.

Figure 5:
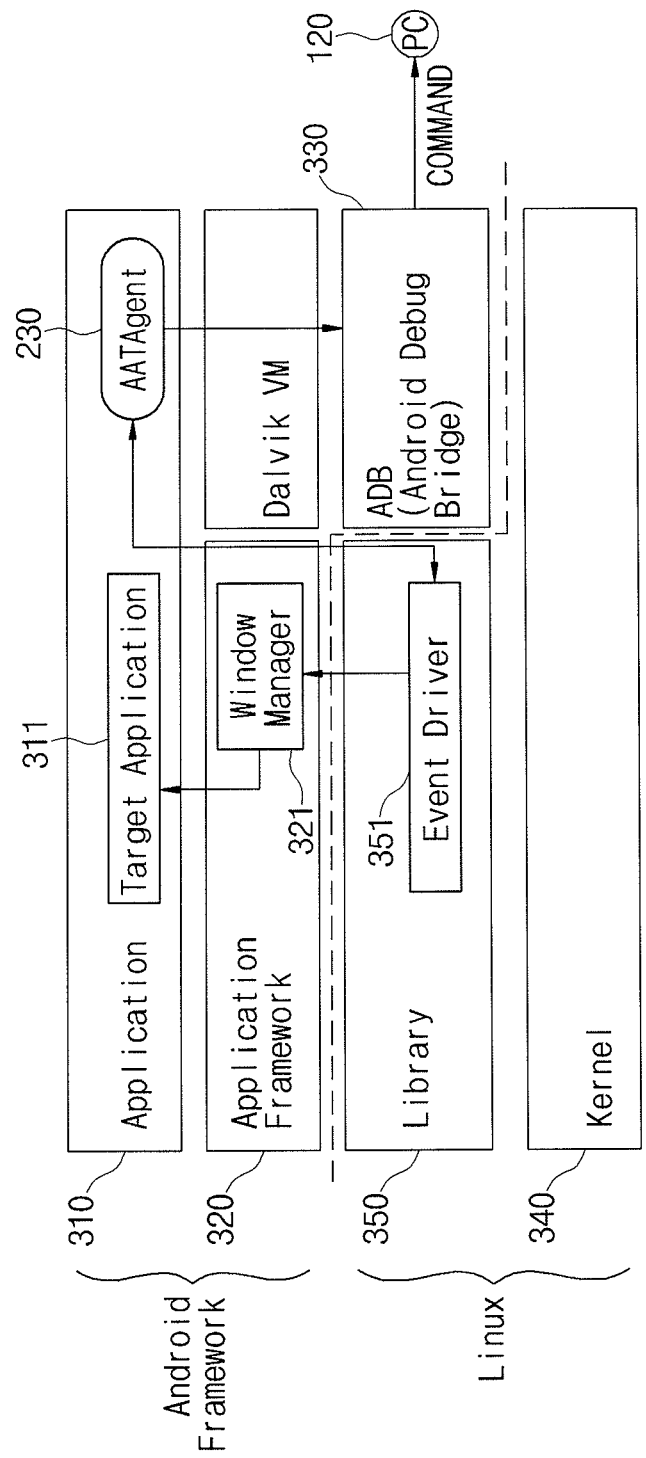
FIG. 5 is a reference diagram for describing a method for transferring an event transferred to a test target application to a testing apparatus according to an exemplary embodiment of the present invention.

FIG. 5 is a reference diagram for describing a method for transferring an event which a test target application receives to a testing apparatus according to an exemplary embodiment of the present invention.

In general, a process of transferring the corresponding event from an event driver 351 of a Linux library 350 collecting all events generated inside and outside the android smart phone through the android application framework 320 is required to transfer any event which is generated by manipulating the android smart phone or an internal operation of the android smart phone to the corresponding application. In this case, there is no general method in which the testing agent 230 that resides on the same application layer 310 can intercept the events transferred to the test target application 311 or know the contents of the events. This is associated with an OS structure in which all the applications does not influence or are not influenced by each other but operate completely independently from each other.

In order to solve the problem, the present invention considers that the android platform structure partially permits the program positioned on the application layer 310 to directly access the event driver 351 of the Linux library 350. The testing agent 230 directly accesses the event driver 351 of the Linux library 350 to acquire all the events. The testing agent 230 analyzes the events acquired from the event driver 351 to classify the analyzed events according to the type. Thereafter, the testing agent 230 extracts the event corresponding to the test target application 311, which is verified according to the classification or only the content of the event and transfers the extracted event or content to the PC 120 through the ADB 330. According to the method, the event corresponding to the test target application 311 may be acquired from all the events generated inside and outside the smart phone to be transferred to the PC 120.

FIG. 6 is a flowchart showing the transferring of the event in FIG. 5.

A user inputs a touch or a key button through an HID 410 in order to transfer the command to the test target application 311. The event acquiring portion 234 of the testing agent 230 directly accesses the event driver 341 in which the events transferred from the HID 410 and all the events generated inside the smart phone are integrated to acquire all the integrated events. The event analyzing portion 235 analyzes the types of all the events acquired by the event acquiring portion 234 and classifies the events according to the type. The touch event and the key event are verified according to the type classification. The touch event and the key event become events transferred to the test target application 311. The event extracting portion 236 extracts only the touch event and key event verified according to the type classification among all the events or transfers only contents of the extracted touch event and key event to the PC 120 through the ADB 330.

According to exemplary embodiments of the present invention, it is possible to test applications of a mobile communication terminal mounted with a platform (e.g., an android platform) that is designed so that applications of an application layer operate independently and a command cannot be directly transferred between the applications. Further, since a testing agent according to the exemplary embodiments of the present invention is made as the application, the testing agent is used while being installed in a smart phone as necessary and when the use is terminated, the testing agent can be uninstalled. Therefore, since the testing agent does not need to be installed in the smart phone, a malfunction of the testing agent or a possibility that the testing agent is abused for hacking can be originally prevented. Contrary to this, an existing test program is inconveniently mounted on the smart phone at the time of shipping the smart phone and since the existing test program cannot be installed and uninstalled as necessary, the existing test program may be abused for the hacking.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for testing a test target application by using a testing agent of a mobile communication terminal having an application layer and a framework layer, wherein the test target application and the testing agent reside on the application layer of a mobile communication terminal mounted with a platform designed so that applications of the application layer operate independently from each other and a command is not directly transferred between the applications, the method comprising:
   receiving by the testing agent, a command for testing the test target application from a testing apparatus connected to the mobile communication terminal;
   generating by the testing agent, an event corresponding to the received command;
   registering by the testing agent, the generated event in a window manager positioned on the framework layer of the mobile communication terminal; and
   transferring by the window manager, the generated event to the test target application.

2. The method of claim 1, wherein in the receiving of the command, the command is received through an android debug bridge (ADB).

3. The method of claim 1, further comprising:
   acquiring events by directly accessing an event driver positioned on a library layer;
   analyzing and classifying the acquired events;
   extracting only an event corresponding to the test target application among the classified events; and
   transferring the extracted event to the testing apparatus.

4. The method of claim 3, wherein in the extracting, only an event content is extracted from the event corresponding to the test target application.

5. The method of claim 3, wherein in the transferring, the extracted event is transferred to the testing apparatus through the android debug bridge (ADB).

6. The method of claim 1, wherein the platform is an android platform.

7. A method for testing a test target application by using a testing agent of a mobile communication terminal having an application layer and a library layer, wherein the test target application and the test agent reside on the application layer of the mobile communication terminal mounted with a platform designed so that applications of the application layer operate independently from each other and a command is not directly transferred between the applications, the method comprising:
- acquiring events by the testing a agent, by directly accessing an event driver positioned on the library layer;
- analyzing and classifying the acquired events by the testing agent;
- extracting by the testing agent, only an event corresponding to the test target application among the classified events; and
- transferring by the testing agent, the extracted event to a testing apparatus connected to the mobile communication terminal.

8. The method of claim 7, wherein in the extracting, only an event content is extracted from the event corresponding to the test target application.

9. The method of claim 7, wherein the platform is an android platform.

10. A mobile communication terminal capable of testing a test target application by using a test agent, wherein the mobile communication terminal has an application layer and an application framework layer and is mounted with a platform designed so that applications of the application layer operate independently from each other and a command is not directly transferred between the applications, the test target application and the test agent residing on the application layer, the mobile communication terminal comprising:
- a communication unit for communicating with a testing apparatus for testing an application operation; and
- a control unit executing the test agent for testing the test target application and including a command analyzing portion analyzing a command for testing the test target application, which is transferred from the testing apparatus through the communication unit, an event generating portion generating an event corresponding to the analyzed command, and an event registering portion registering the generated event in a window manager of the application framework layer of the mobile communication terminal,
wherein the window manager of the application framework layer transfers the generated event to the test target application.

11. The mobile communication terminal of claim 10, wherein the control unit further includes:
- an event acquiring portion acquiring events by directly accessing an event driver positioned on a library layer;
- an event analyzing portion analyzing the acquired events; and
- an event extracting portion extracting only an event corresponding to the test target application according to the analysis result and transferring the extracted event to the testing apparatus.

12. The mobile communication terminal of claim 10, wherein the platform is an android platform.

* * * * *